US008917004B2

(12) United States Patent
Kalev et al.

(10) Patent No.: US 8,917,004 B2
(45) Date of Patent: Dec. 23, 2014

(54) HOMOPOLAR MOTOR-GENERATOR

(75) Inventors: Claude Michael Kalev, Newbury Park, CA (US); Heath F. Hofmann, Ann Arbor, MI (US)

(73) Assignee: Rotonix Hong Kong Limited

( * ) Notice: Subject to any disclaimer, the term of this patent is extended or adjusted under 35 U.S.C. 154(b) by 29 days.

(21) Appl. No.: 13/343,603

(22) Filed: Jan. 4, 2012

(65) Prior Publication Data
US 2014/0084714 A1 Mar. 27, 2014

Related U.S. Application Data

(60) Provisional application No. 61/568,126, filed on Dec. 7, 2011.

(51) Int. Cl.
*H02K 47/04* (2006.01)
*H02K 47/06* (2006.01)
*H02K 47/14* (2006.01)
*H02K 47/20* (2006.01)

(52) U.S. Cl.
USPC ............ 310/102 R; 310/102 A; 310/112; 310/156.37

(58) Field of Classification Search
CPC ....... H02K 47/14; H02K 55/06; H02K 19/18; H02K 37/18
USPC .............. 310/102 A, 102 R, 112, 156.37
See application file for complete search history.

(56) References Cited

U.S. PATENT DOCUMENTS

| 2,001,604 | A | * | 5/1935 | Finch ..................... 310/163 |
| 4,032,807 | A | * | 6/1977 | Richter ................... 310/178 |
| 4,462,859 | A | | 7/1984 | Nakamura |
| 5,231,324 | A | | 7/1993 | Kawamura et al. |
| 5,462,402 | A | | 10/1995 | Bakholdin et al. |
| 5,559,381 | A | | 9/1996 | Rosen et al. |
| 5,566,588 | A | | 10/1996 | Rosen et al. |
| 5,628,232 | A | | 5/1997 | Rosen et al. |
| 5,708,312 | A | | 1/1998 | Rosen et al. |
| 5,998,899 | A | | 12/1999 | Rosen et al. |
| 6,144,128 | A | | 11/2000 | Rosen |
| 6,175,172 | B1 | | 1/2001 | Bakholdin et al. |
| 6,347,925 | B1 | | 2/2002 | Woodard et al. |
| 6,614,132 | B2 | | 9/2003 | Hockney et al. |
| 6,675,872 | B2 | | 1/2004 | Lewis et al. |
| 6,741,007 | B2 | | 5/2004 | Frash et al. |
| 6,747,378 | B2 | | 6/2004 | Brackett |

(Continued)

FOREIGN PATENT DOCUMENTS

| JP | 10-155262 A | 6/1998 |
| JP | 10-271784 A | 10/1998 |
| JP | 2011-125126 A | 6/2011 |
| KR | 10-2007-0070355 A | 7/2007 |

OTHER PUBLICATIONS

Tsao et al., A Synchronous Homopolar Machine for High-Speed Applications, Department of Electrical Engineering, University of California, Berkeley, Berkeley, CA 94720, www-power.eecs.berkeley.edu, published at least as early as Oct. 18, 2002.

*Primary Examiner* — Terrance Kenerly
(74) *Attorney, Agent, or Firm* — Paul D. Chancellor; Ocean Law

(57) ABSTRACT

A motor-generator utilizes a multi-part rotor encircling a stator, the rotor including a plurality of rotor segments.

15 Claims, 15 Drawing Sheets

(56) References Cited

U.S. PATENT DOCUMENTS

| | | | |
|---|---|---|---|
| 6,817,266 B1 | 11/2004 | Brackett | |
| 6,824,861 B2 | 11/2004 | Spears | |
| 6,852,401 B2 | 2/2005 | Spears et al. | |
| 6,884,039 B2 | 4/2005 | Woodard et al. | |
| 6,959,756 B2 | 11/2005 | Woodard et al. | |
| 7,034,420 B2 | 4/2006 | Brackett et al. | |
| 7,174,806 B2 | 2/2007 | Brackett et al. | |
| 7,365,461 B2 | 4/2008 | Brackett et al. | |
| 7,633,172 B2 | 12/2009 | Kalev et al. | |
| 7,679,245 B2 | 3/2010 | Brackett et al. | |
| 7,679,247 B2 | 3/2010 | Wang | |
| 7,830,055 B2 | 11/2010 | Arseneaux et al. | |
| 7,834,479 B2 | 11/2010 | Capp et al. | |
| 7,855,465 B2 | 12/2010 | Kalev et al. | |
| 8,008,804 B2 | 8/2011 | Capp et al. | |
| 8,030,787 B2 | 10/2011 | Kalev | |
| 8,102,144 B2 | 1/2012 | Capp et al. | |
| 2002/0047448 A1* | 4/2002 | Kawamura | 310/181 |
| 2006/0028085 A1* | 2/2006 | Qu et al. | 310/178 |
| 2006/0158055 A1* | 7/2006 | Ivtsenkov | 310/156.01 |
| 2007/0164628 A1* | 7/2007 | Fonseca et al. | 310/112 |
| 2008/0088200 A1* | 4/2008 | Ritchey | 310/268 |
| 2010/0090560 A1* | 4/2010 | Myojin | 310/216.043 |
| 2010/0141213 A1* | 6/2010 | Iida | 320/134 |
| 2010/0156205 A1* | 6/2010 | Davis et al. | 310/46 |

* cited by examiner

A+B+C=0
1A-1/2B-1/2C=0

US 8,917,004 B2

HOMOPOLAR MOTOR-GENERATOR

PRIORITY CLAIM

This application claims the benefit of Provisional Patent Application No. 61/568,126 filed Dec. 7, 2011 which is incorporated herein in its entirety and for all purposes.

BACKGROUND OF THE INVENTION

1. Field of Invention

The present invention relates to an electric machine. In particular, a homopolar motor-generator is disclosed.

2. Discussion of the Related Art

Simple homopolar motors have been known since discovery of the Faraday motor in 1831. In Faraday's invention, a current carrying wire hanging alongside a bar magnet included in the circuit revolves about the magnet due to interaction of the two magnetic fields. Faraday's motor illustrates "Lorentz forces" which are at right angles to both the direction in which a charged particle is moving and the direction of an applied magnetic field. The simple application of the Lorentz force equation ('crossing' the direction, v, of the current into the direction, B, of the magnetic field) yields a rotational force.

Homopolar motors and homopolar motor-generators ("homopolar machines") are not widely used in practice and have not generally been the subject of academic research or industrial development. Explanations for this paucity of interest in homopolar motors likely includes the homopolar motor's use of only half of the magnetic flux density resulting in a machine that has twice the volume of competing machines such as synchronous reluctance machines.

SUMMARY OF THE INVENTION

A homopolar motor-generator includes a multi-part rotor encircling a stator. In some embodiments, a homopolar motor comprises: a core assembly including a motor-generator stator; a plurality of stator rings arranged about a central axis; armature coils interengaging slots of the stator rings; one or more field coils, each coil encircling the central axis; a motor-generator rotor encircling the stator; the motor-generator rotor including a plurality of rotor segments; each rotor segment for completing a magnetic circuit between first and second slotted stator rings; and, each rotor segment separated from the other rotor segments by non-magnetic material.

BRIEF DESCRIPTION OF THE DRAWINGS

The present invention is described with reference to the accompanying figures. These figures, incorporated herein and forming part of the specification, illustrate the present invention and, together with the description, further serve to explain the principles of the invention and to enable a person skilled in the relevant art to make and use the invention.

DETAILED DESCRIPTION OF THE PREFERRED EMBODIMENTS

The disclosure provided in the following pages describes examples of some embodiments of the invention. The designs, figures, and descriptions are non-limiting examples of certain embodiments of the invention. For example, other embodiments of the disclosed device may or may not include the features described herein. Moreover, disclosed advantages and benefits may apply to only certain embodiments of the invention and should not be used to limit the disclosed inventions.

As used herein, the term "coupled" includes direct and indirect connections. Moreover, where first and second devices are coupled, interposed devices including active devices may be located therebetween.

Figure 1:
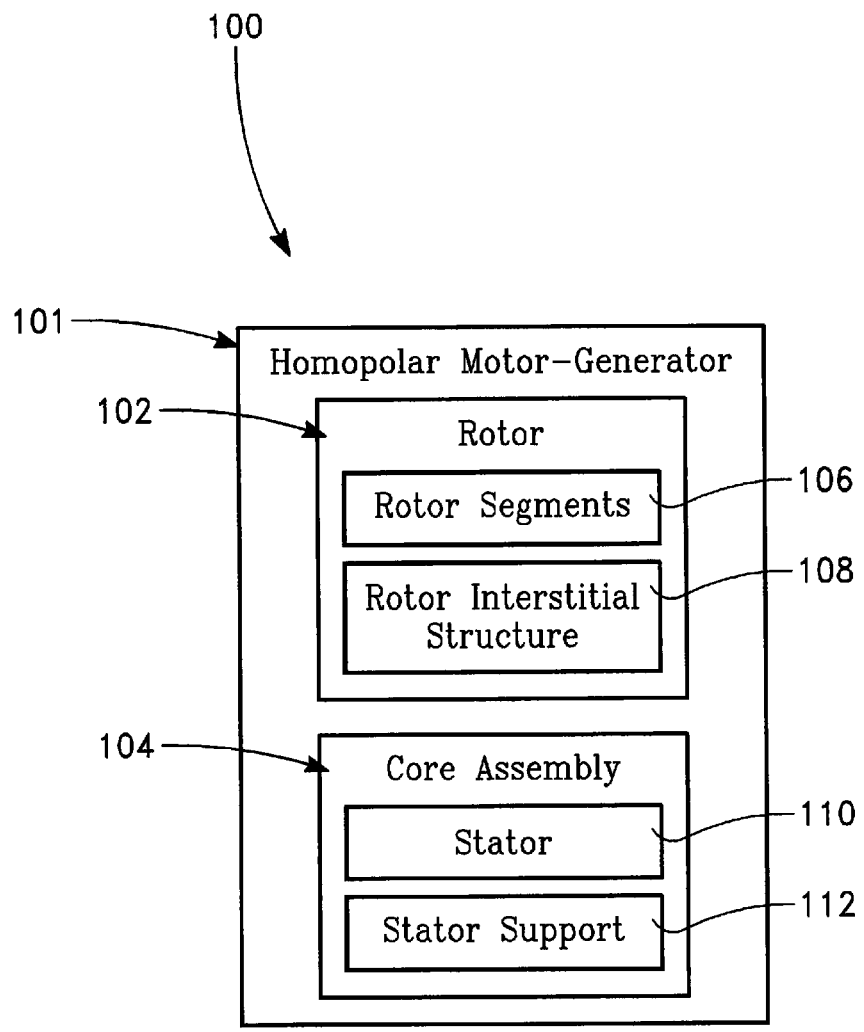
FIG. 1 shows a block diagram of a homopolar machine in accordance with the present invention.

FIG. 1 shows a block diagram of a first homopolar machine 100. The first homopolar machine 101 includes a rotor 102 and a core assembly 104. The rotor includes multiple magnetic parts such as the rotor segments shown 106. In addition the rotor includes interstitial structure(s) 108. The core assembly includes a stator 110 and a stator support 112.

Figure 2:
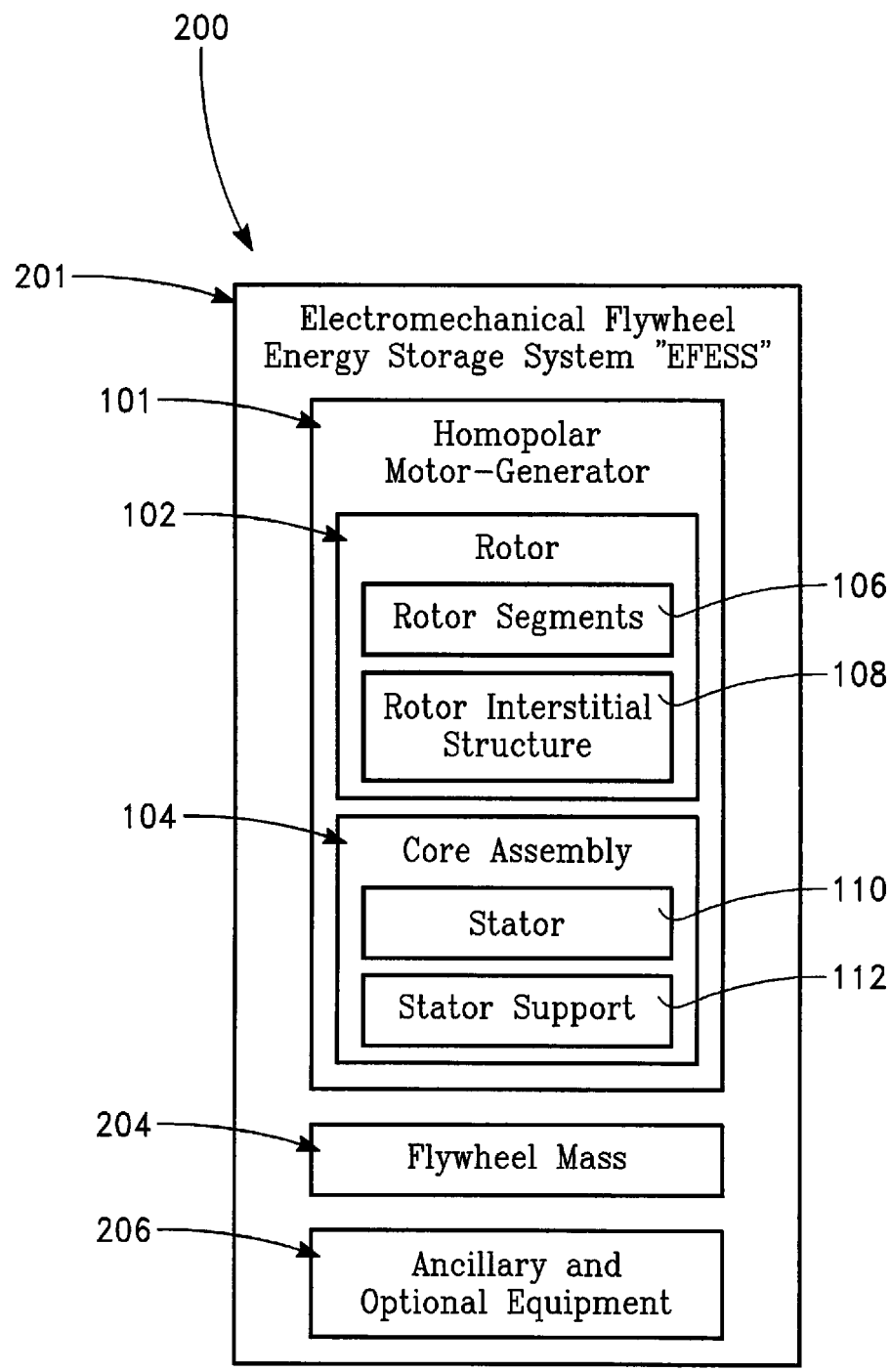
FIG. 2 shows a block diagram of an electromechanical flywheel energy storage system incorporating the machine of FIG. 1.

FIG. 2 shows an electromechanical flywheel energy storage system block diagram "EFESS" 200. The energy storage system 201 includes a homopolar motor-generator 101, a flywheel mass 204, and ancillary and optional equipment 206.

Homopolar machine components include a rotor 102 and a core assembly 104. As mentioned above, rotor components include rotor segments 106 and rotor interstitial structure 108 and core assembly components include a stator 110 and a stator support 112.

Despite the flywheel industry's general preference for motor-generator technologies such as synchronous reluctance technologies, applicant's disclosure shows homopolar machine embodiments can offer some improvements over common motor-generator technologies used in this application. Applicant also notes that the electro-mechanical flywheel energy storage system is but one application to which applicant's homopolar motor-generator is suited.

Figure 3:
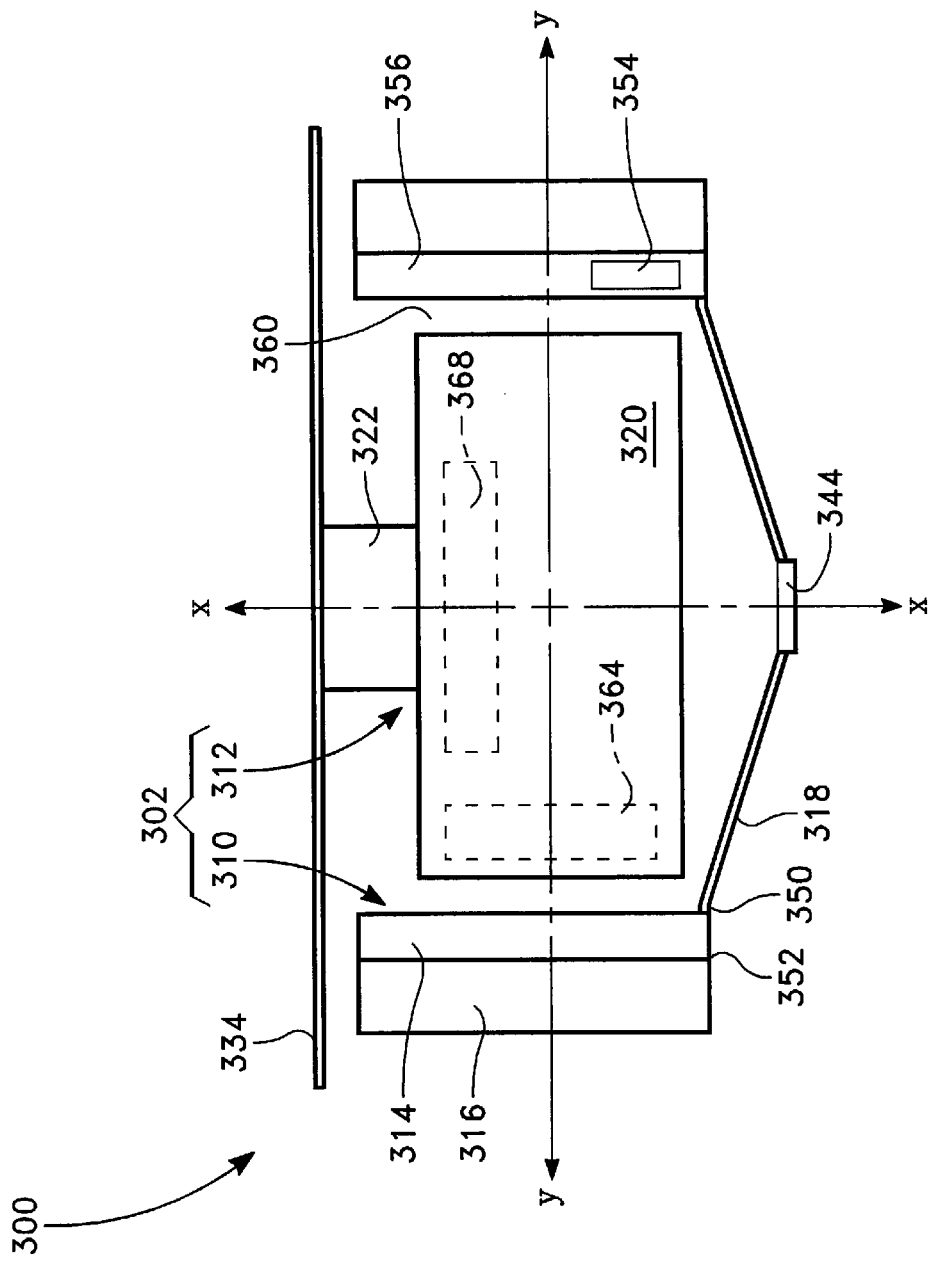
FIG. 3 shows a schematic of a portion of an electromechanical flywheel energy storage system of FIG. 2.

FIG. 3 shows a schematic of a portion of an electromechanical flywheel energy storage system incorporating a homopolar motor-generator 300. An energy exchange block 302 includes a spinning assembly 310 and a core assembly 312. Included in the spinning assembly is a motor-generator rotor 314, a flywheel mass encircling and coupled to the rotor 316. In various embodiments, the energy exchange block includes a hub 318 coupled to the flywheel mass, and a moving suspension element 344. In some embodiments, a support such as a sleeve or cylinder, for example a non-magnetic sleeve or cylinder, is interposed between the rotor and the flywheel mass for, inter alia, limiting rotor radial expansion, backing the rotor, and/or providing support to the rotor. Suitable sleeve materials include non-magnetic materials such as non-magnetic metals such as alloys, for example non-magnetic stainless steel, and non-magnetic super alloys, for example non-magnetic inconel.

The rotor, flywheel mass, hub, and moving suspension element are for rotation in synchrony about an axis x-x and in various embodiments the hub is attached to one or both of the rotor 350 and the flywheel mass 352. Included in the core assembly 312 are a stator 320 and a stator support 322. In some embodiments, the stator support is coupled to a housing wall such as a housing wall associated with a vacuum barrier 334.

Encircling the motor-generator stator 320 is the motor-generator rotor 314. In various embodiments, the rotor 314 is a multipart fabrication and in some embodiments includes magnetic 354 and nonmagnetic 356 portions. In some embodiments, the nonmagnetic portion is or includes blocking or matrix material supporting the magnetic portions. In an embodiment, the magnetic rotor portions are laminated structures.

In various embodiments, the stator 320 includes a magnetic structure with one or more interengaged coils having electrically conductive windings capable of carrying variable currents and thereby varying the magnetic flux of the magnetic structure. In some embodiments, a first stator coil 364 encircles an imaginary y-y axis that is about perpendicular to the x-x axis. And, in some embodiments, a second stator coil 368 encircles the x-x axis. In an embodiment, a plurality of first stator coils encircle respective imaginary y-y axes and one or more second stator coils encircle the x-x axis, the first stator coils being armature coils and the second stator coils being field coils.

The motor-generator 360 is a homopolar machine with an inside-out arrangement (rotor encircles stator) wherein a) a rotatable rotor similar to rotor 314 includes coil-less, laminated magnetic structures, b) a stationery central stator similar to stator 320 includes laminated magnetic structures with coils for creating a magnetic flux in the magnetic structures and c) the rotor encircles the stator.

Figures 4A, 4B:
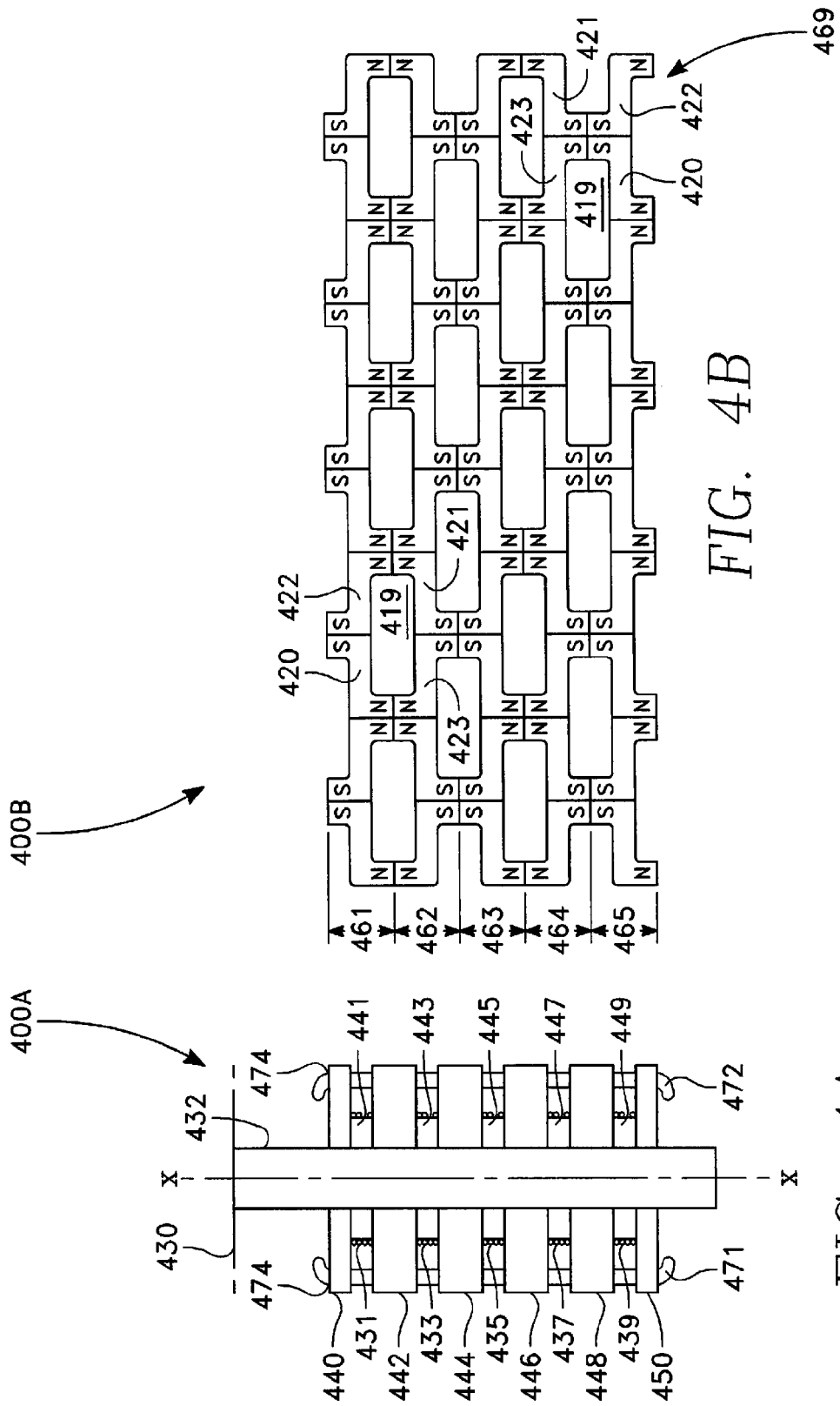
FIGS. 4A-B show a rotor and a stator for a five stage homopolar machine.

FIGS. 4A and 4B show a rotor 400A and a stator 400B for a five stage 461-465 homopolar machine, each stage having five poles. According to the number of poles in a single stage, the machine is referred to as a "5 pole" machine. Unless otherwise stated or indicated by context, references to "pole" mean a full pole or a pole pair in contrast to a ½ pole which is typically referred to as such.

The described five pole, five stage machine is exemplary. As persons of ordinary skill in the art will recognize, the number of poles and the number of stages can be selected to suit different specifications and applications. For example, the disclosure herein can be used by skilled artisans to make and use homopolar machines of 2 or more poles and having 1 or more stages.

Shown in FIG. 4B is a multi-part rotor 400B having, inter alia, a plurality of rotor magnetic path parts 420-423. Each part has two ½ magnetic poles, one marked N for North and the other marked S for South. As will be explained further below, a side-iron extends between the ½ poles of each part to complete the magnetic path. We refer to these magnetic path parts as rotor segments.

As shown in 400B, the rotor segments 420-423 appear as if a normally cylindrical rotor structure 314 is "unrolled" to present a planar surface. The rotor segment arrangement is seen to create a lattice-like structure 469 with spaces between the parts 419. The spaces being filled, in various embodiments, with non-magnetic material(s), for example one or more of resinous solids such as epoxies and related composites such as carbon composites, non-metallic metals, other suitable fillers known to persons of ordinary skill in the art, and blocking structures made from any of these.

A total of fifty rotor segments 420-423 make up a lattice 469 forming the first through fifth stages 461-465, each stage having 5 North poles and 5 corresponding South poles. Notably, NN and SS denote full poles while N and S denote ½ poles.

In the embodiment shown, the first, third and fifth stages 461, 463, 465 have South poles SS, SS, SS, SS, SS and North poles N, NN, NN, NN, NN, N. The second and fourth stages 462, 464, have North poles N, NN, NN, NN, NN, N and South poles SS, SS, SS, SS, SS. North poles of the first stage align with North poles of the second stage, South poles of the second stage align with South poles of the third stage, North poles of the third stage align with North poles of the fourth stage, and South poles of the fourth stage align with South poles of the fifth stage.

Each stage 461-465 includes ten rotor segments. As shown in 400B, from left to right the rotor segments used in the first, third and fifth stages 461, 463, 465 are 420, 422, 420, 422, 420, 422, 420, 422, 420, 422 and the rotor segments used in the second and fourth stages 462, 464 are 423, 421, 423, 421, 423, 421, 423, 421, 423, 421.

Also shown is a cross-sectional view of a stator 400A for use with the rotor 400B. As seen, the stator has large 440, 442, 444, 446, 448, 450 and small 441, 443, 445, 447, 449 diameter rims centered on an x-x axis. First through fourth large diameter intermediate rims 442, 444, 446, 448 are interposed between large diameter peripheral rims 440, 450. One small diameter rim 441, 443, 445, 447, 449 is interposed between each pair of large diameter rims such that the rims are stacked in an order 440-450 inclusive. The rims are supported by a coupled stator support 432 that is supported via a structure such as a containment wall 430.

A plurality of armature windings eg. 471, 472 interengage a plurality of the large diameter rim peripheries 474 via slots or a similar feature. Field windings 431, 433, 435, 437, 439 encircle the stator axis of rotation x-x. In various embodiments, each field winding encircles a periphery of a respective small diameter rim such that each field winding is located between a respective pair of large diameter rims.

As can be seen, the lattice structure of the rotor 400B is arranged such that the first rim of the stator 440 corresponds to the South poles of the first stage 461; the third rim of the stator 442 corresponds to the North poles of the first and second stages 461, 462; the fifth rim of the stator 444 corresponds to the South poles of the second and third stages 462, 463; the seventh rim of the stator 446 corresponds to the North poles of the third and fourth stages 463, 464; the ninth rim of the stator 448 corresponds to the South poles of the fourth and fifth stages 464, 465; and, the eleventh rim of the stator 450 corresponds to the North poles of the fifth stage 465.

Figure 5A:
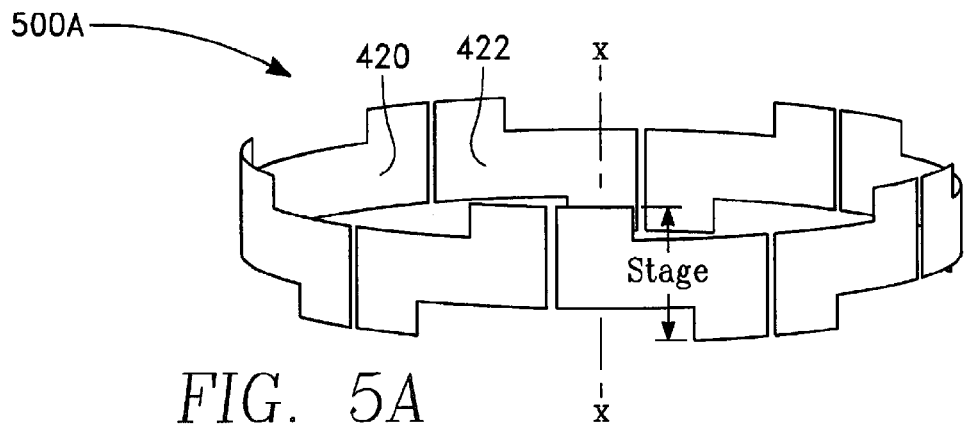
FIG. 5A shows a perspective view of rotor segments used in one stage of the machine of FIG. 4B.

FIG. 5A shows a perspective view of rotor segments used in one stage of a five pole homopolar machine 500A. As seen, ten rotor segments, such as those in the first stage of a 5 stage machine 420, 422, encircle an axis of rotation x-x.

Figure 5B:
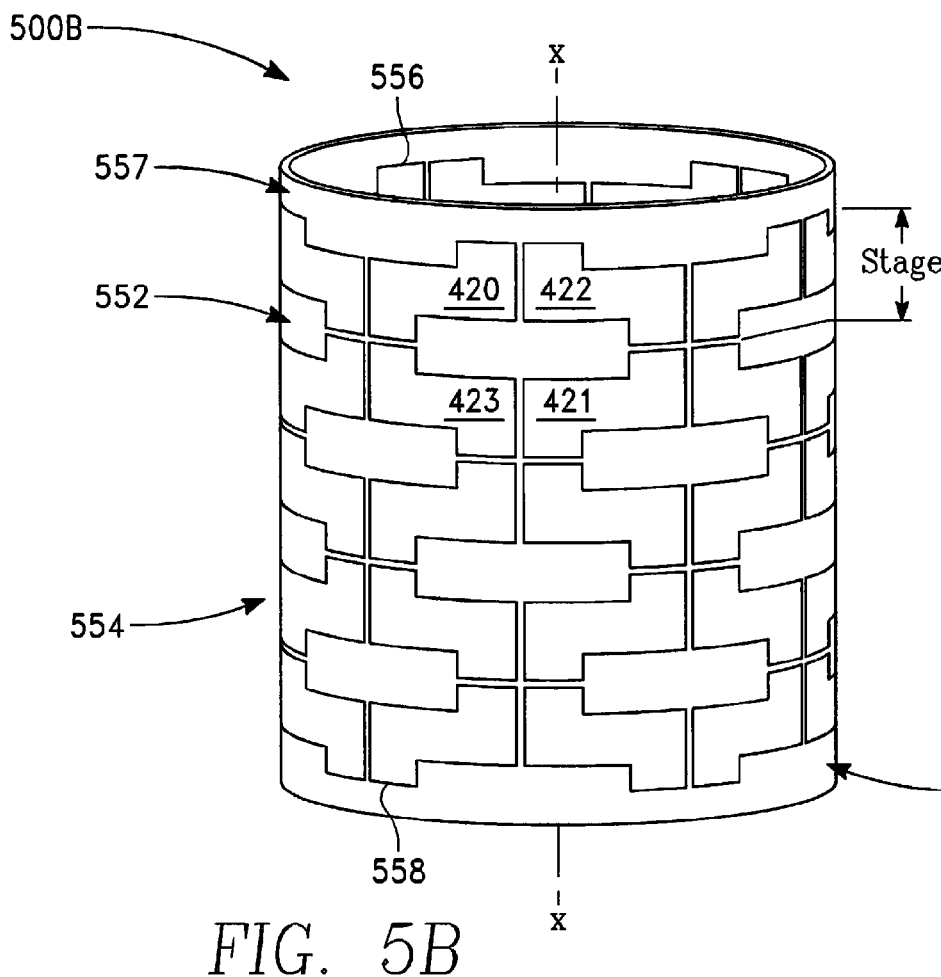
FIG. 5B shows a perspective view of a five stage homopolar rotor of FIG. 4B.

FIG. 5B shows a perspective view of a five stage homopolar rotor 500B. As shown, four rotor segment types 420-423 are used to assemble a circular lattice 554 of fifty rotor segments. An interstitial structure 552 fills gaps between the rotor segments (as shown). In some embodiments, the interstitial structure extends to cover, at least in part, an inner 556 and/or an outer 558 surface of the rotor segments (not shown). And, in some embodiments, the interstitial structure extends axially x-x beyond the rotor segments 557, 559.

Figure 5C:
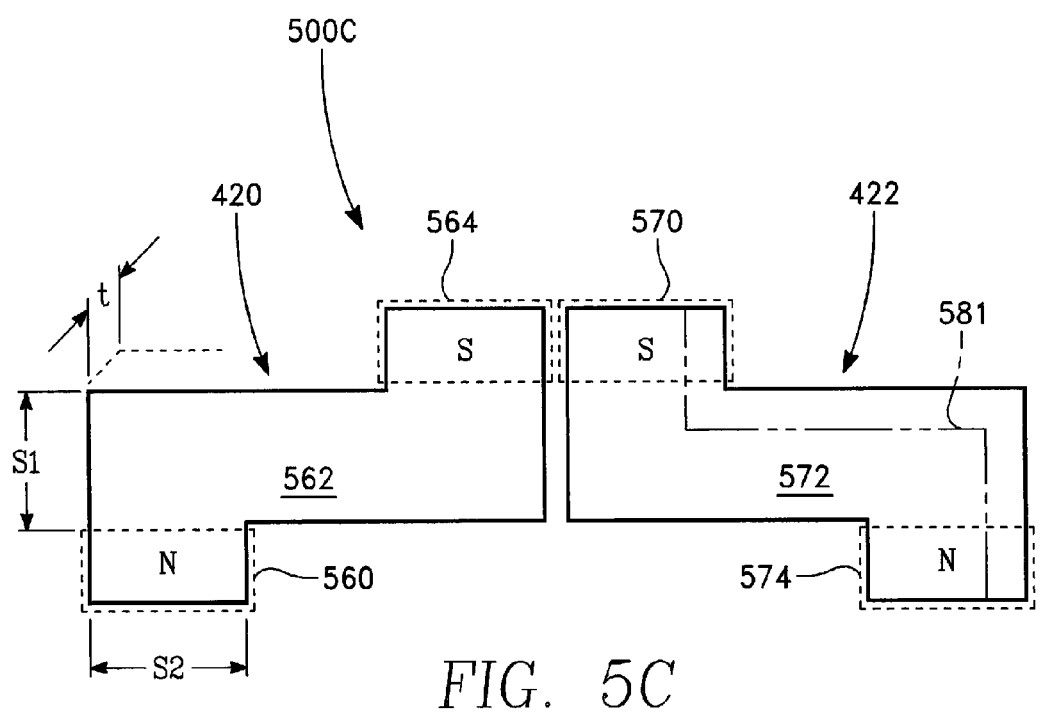
FIG. 5C shows a side view of adjacent rotor segments of a homopolar rotor of FIG. 4B.
Figure 5D:
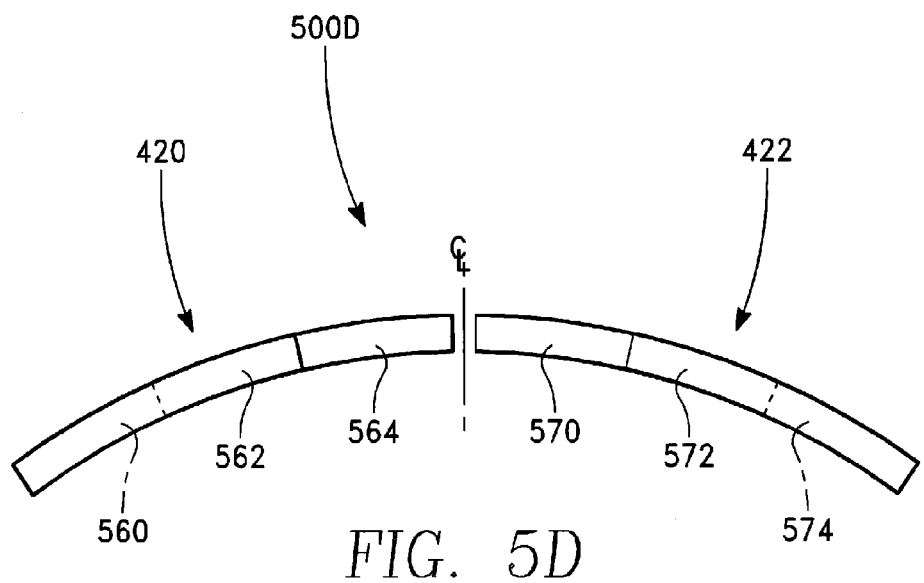
FIG. 5D shows a top view of the rotor segments of FIG. 5C.

FIG. 5C shows a side view of adjacent rotor segments 500C and FIG. 5D shows a top view of the same rotor segments 500D. In various embodiments, the rotor segments 420-423 are laminated structures (see lamella 581 of FIG. 5C) and in various embodiments the rotor segments are not laminated structures.

As shown in FIGS. 5C-D, first and second rotor segments 420, 422 include respective North 560, 574 and South 564, 570 ½ poles. Interconnecting the North and South ½ poles of the first rotor segment is a first side iron 562 and interconnecting the North and South ½ poles of the second rotor segment is a second side iron 572.

In some embodiments, attenuation of magnetic flux traveling through the side iron is matched or approximately matched with the attenuation of magnetic flux traveling through the poles. In an embodiment, the cross-sectional area of the poles and the side-iron along the rotor segment magnetic flux path is equal or about equal. For example, for a constant rotor segment thickness "t", setting dimension S1 of the side iron equal to dimension S2 of the pole defines the two equal cross-sectional areas (S1×t) and (S2×t), the first being about perpendicular to the direction of magnetic flux in the side iron and the second being about perpendicular to the direction of magnetic flux in the pole.

Figure 5E:
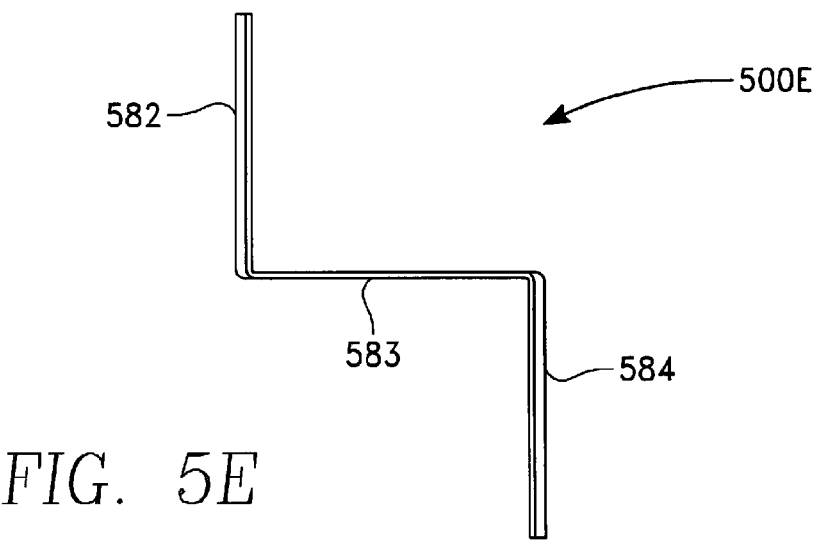
FIGS. 5E-F show side and perspective views of lamella used in the rotor segments of FIG. 5C.
Figure 5F:
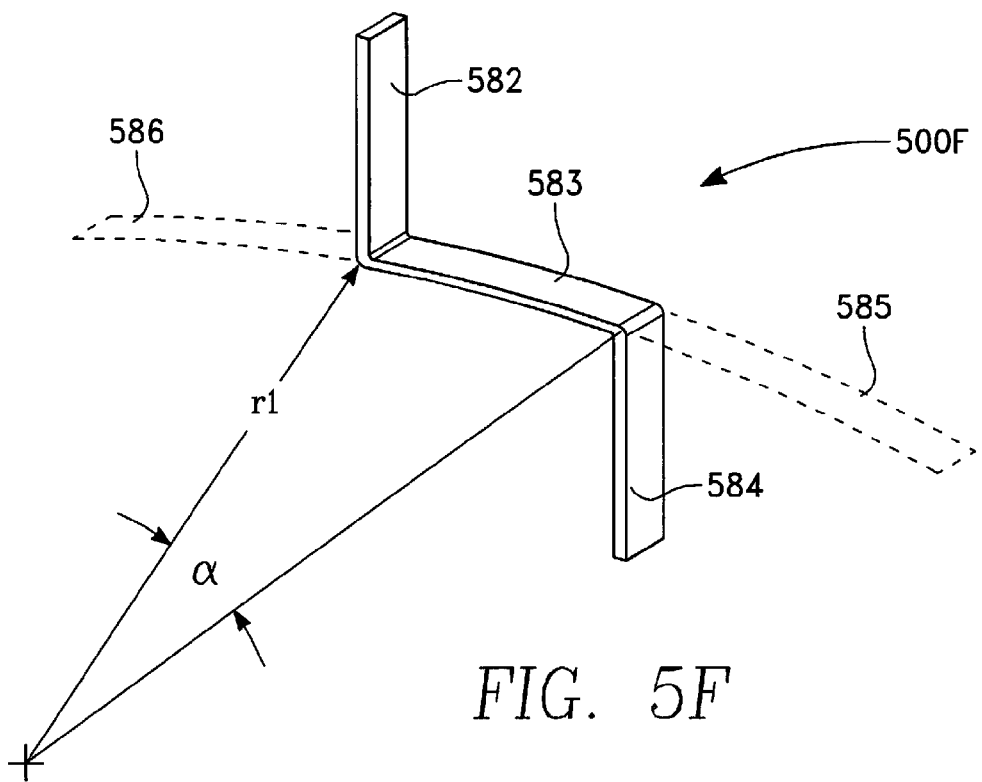

FIGS. 5E-F show a lamella (see also typical lamella shown as option in FIG. 5C) side view and a lamella perspective view 500E, 500F. As shown, the lamella has upturned and downturned projections 582, 584 interconnected by a midsection 583. Referring to FIG. 5C, the upturned projection corresponds to a part of the South pole 570, the downturned projection corresponds to a part of the North pole 574, and the midsection corresponds to a part of the side iron 572.

In an embodiment, lamella are cut or otherwise separated from sheet stock such that the separated parts are initially planar 586, 583, 585. Bending a first extension 586 upward forms the upturned projection 582 and bending a second extension 584 downward forms the downturned projection 584. To the extent the parts are contoured to fit a cylindrical shape such as a cylindrical annulus defined by a rotor, the midsection can be curved to a radius "r1" through an angle "α" to accommodate the machine design including the number of poles.

In various embodiments using any of cutting dies, torches, lasers, mills and the like, the rotor segments are separated from sheet stock to produce a planar part with a curved midsection and the extensions to either side of the midsection are bent in opposite directions to form an unfinished rotor segment. Stacking and laminating, such as with varnish or another suitable insulating material using vacuum impregnation or another suitable method follows. Following lamination, the unfinished ends of the rotor segment are cut to length.

Figure 5G:
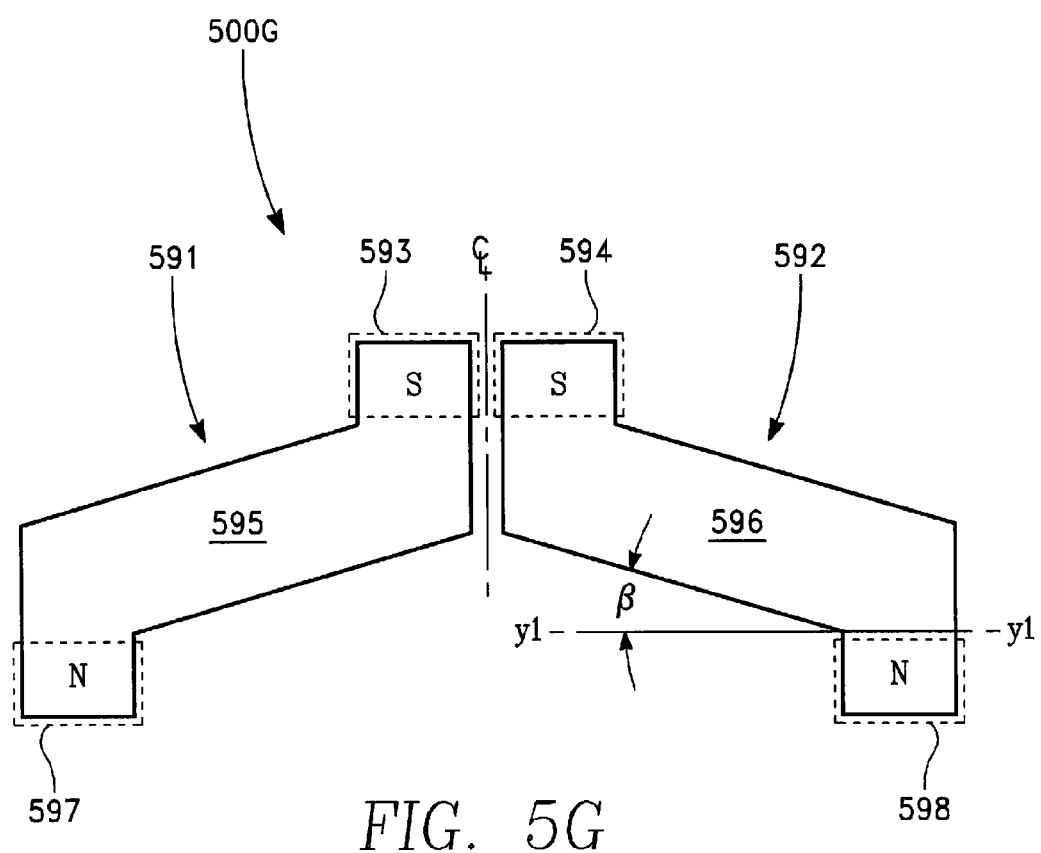
FIG. 5G shows a side view of adjacent sloped rotor segments.

FIG. 5G shows a side view of adjacent sloped rotor segments 500G. North ½ poles 597, 598 and South ½ poles 593, 594 of respective rotor segments 591, 592 are interconnected by corresponding side irons 595, 596 having sides sloped at an angle β with respect to an axis y1-y1 perpendicular to the centerline ₵. In some embodiments, the angle β is in the range of 10 to 30 degrees and, in some embodiments, the angle β is in the range of 19.9+/−5 degrees. Various embodiments of rotor segments with sloped side irons are laminated structures made with lamella similar to those shown in FIGS. 5E and 5F. As compared to rotor segments without sloped side irons (FIG. 5C), rotor segments with sloped side irons are useful, inter alia, for reducing transfers of armature magnetic flux (as distinguished from field magnetic flux) to the rotor segments because the sloped side iron is no longer aligned with the stator teeth (see below).

Figure 6:
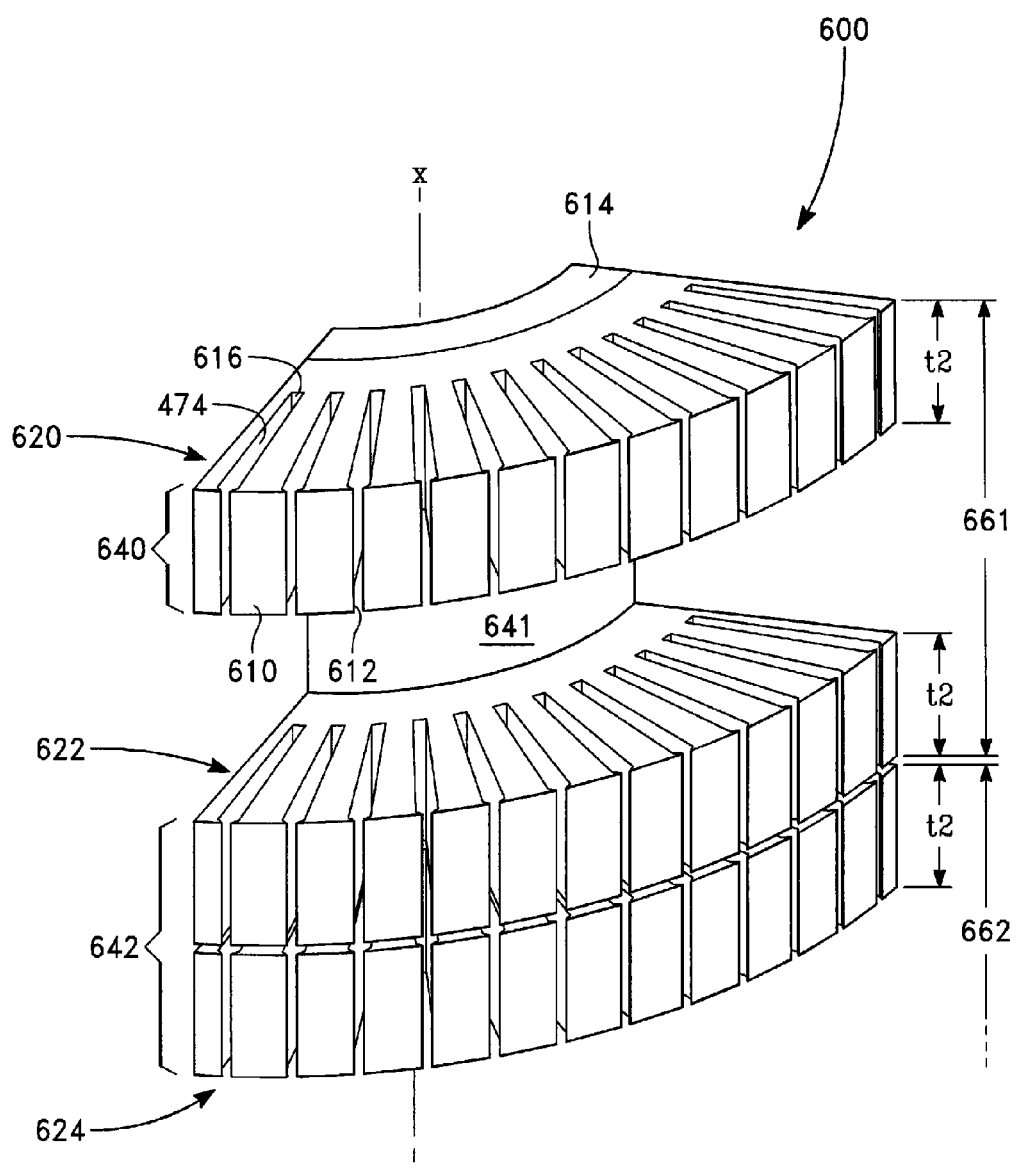
FIG. 6 shows a stator sector of FIG. 4A.

FIG. 6 illustrates a stator sector 600. The stator sector corresponds to a stator sector of one embodiment of the stator of FIG. 4A. In particular, the stator sector illustrates a sector of one stage 661 (see also 461) and a sector of a partial stage 662 (see also 462). Three rims include a peripheral large diameter rim 640 (see also 440), an intermediate large diameter rim (or two adjacent rims as shown) 642 (see also 442), and a small diameter rim therebetween 641 (see also 441). In various embodiments, the small diameter rim is a portion of a continuous armature back iron cylinder 614, and in various embodiments the rims are fixed to the back iron cylinder as integral parts and/or fit such as via shrink fit, mechanical fixtures, welding/weldment(s), and the like.

The peripheral large diameter rim 640 has a single platen 620 of thickness t2. The intermediate large diameter rim 642 has two platens 622, 624. Each of the platens has radial slots 474 extending from the platen periphery 612, the slots being designed to receive armature windings 471, 472 and in some embodiments the slots being designed to receive armature windings atop heat pipes (not shown). Separating each pair of adjacent slots is a stator tooth 610 that extends from the base of the slot 616 to the platen periphery.

As explained in connection with FIG. 3, the stator has armature coils and field coils. Armature coils 364, 471, 472 are interengaged with the stator's large rims as described above and field coils encircle the stator's small rims. In various embodiments, the field coils are powered by a direct current power source and magnetize the rotor segments during motor-generator operation. In similar fashion, armature coils magnetize the stator teeth during motor operation and it is the interaction of rotor and stator magnetic forces that produce torque for a motor mode of operation (consuming electric power) and a torque for a generator mode of operation (generating electric power).

Persons of ordinary skill in the art will recognize that motor-generator armature coils can be arranged in many different ways. For example, the coils may be arranged for single phase or three phase operation. Further, slot spacing may be chosen to provide particular device characteristics such as to reduce rotor heating due to armature winding losses. The disclosures of U.S. Pat. No. 4,462,859 to Nakamura and U.S. Pat. No. 5,231,324 to Kawamura et al. are incorporated herein in their entireties and for all purposes including in particular their disclosure of armature windings, armature winding designs, and armature winding arrangements.

In an embodiment, the armature windings 364 of the stator 312 are arranged to accommodate a homopolar motor-generator design used in conjunction with multiple electric power converters such that multiple power channels are enabled. For example, in a five pole machine, one electric power converter is associated with each of the five poles such that five power channels are enabled. Advantages of these arrangements over single power converter designs include lower power ratings and lower associated current ratings for power semiconductors, such as integrated gate bipolar transistors (IGBT), used in the multiple power converters. Notably, the number of power channels may be, within reason, varied as needed. For example, one criteria for selecting the number of power channels is a limitation placed on semiconductor current ratings resulting in a generally inverse relationship between the number of power channels and the semiconductor current rating.

Figure 7A:
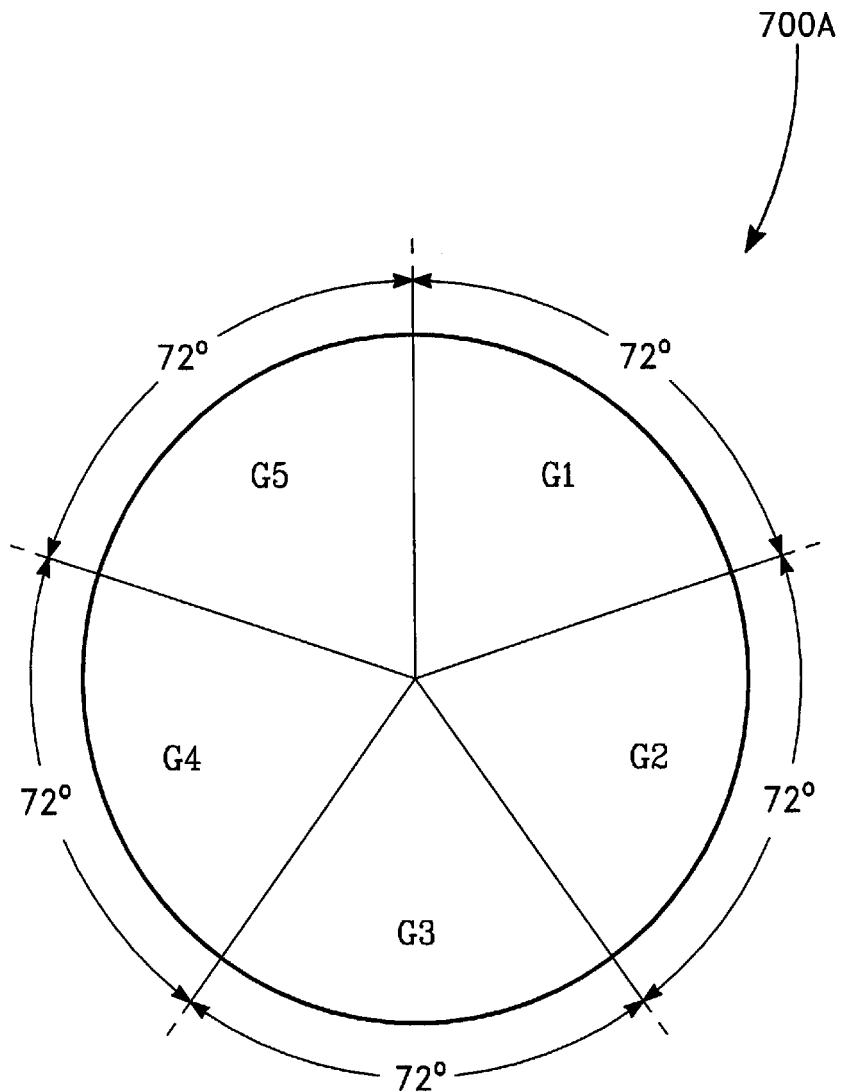
FIG. 7A shows a schematic cross-section of a stator of a five pole homopolar motor-generator for use in conjunction with five power converters.

FIG. 7A shows a schematic cross-section of a stator of a five pole homopolar motor-generator for use in conjunction with five power converters 700A. As can be seen, the stator cross-section is divided into five radially bounded sections G1-G5, each radially bounded section sweeping out a 72° arc. Each radially bounded section will be referred to as a stator channel such that each power channel includes a stator channel and an electrically coupled converter channel.

Figures 7B, 7C:
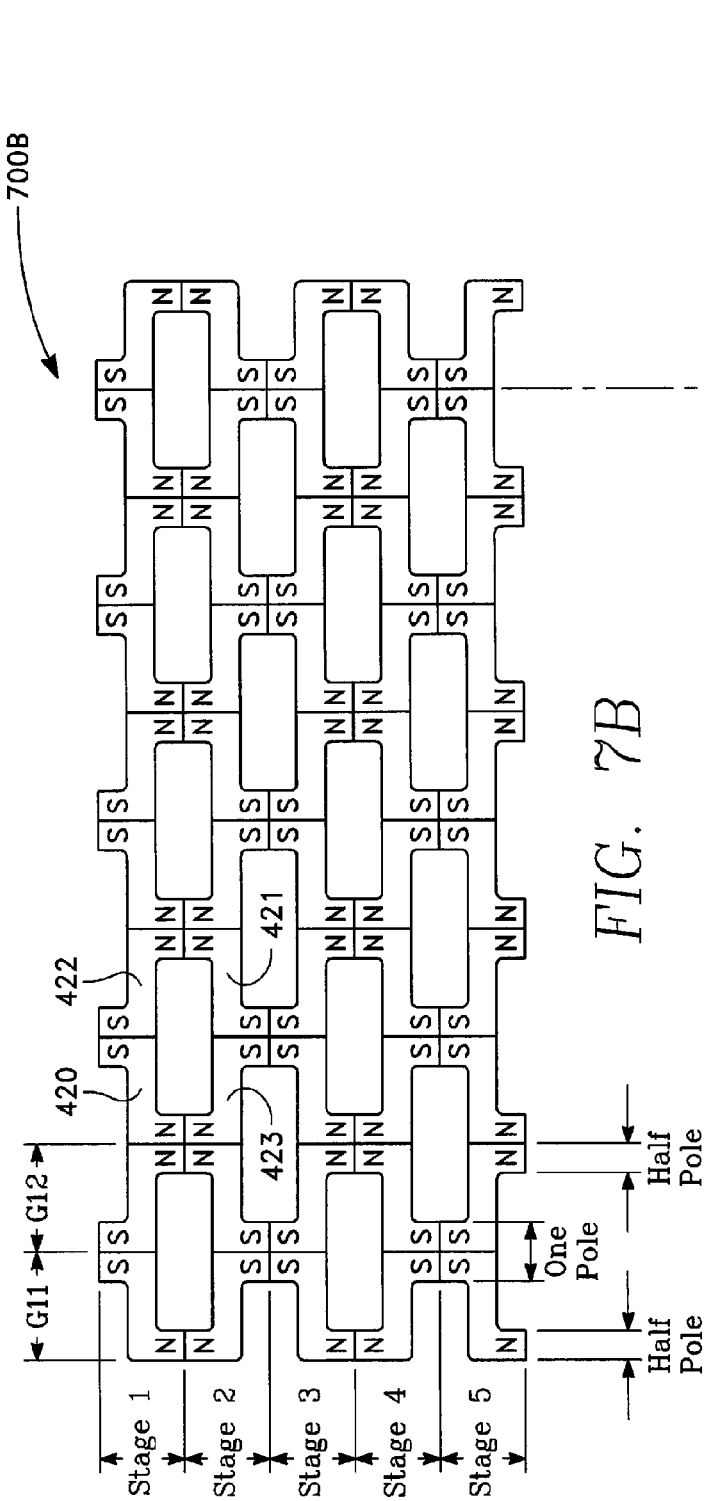
FIG. 7B shows a lattice of rotor segments configured for use with a five pole, five stage homopolar motor-generator.
FIG. 7C shows how the lattice of FIG. 7B is divided into stator channels to support five power channels.

FIG. 7B shows lattice of rotor segments configured for use with a 5 pole, 5 stage homopolar motor-generator 700B. Corresponding FIG. 7C shows how the lattice is divided into stator channels G1-G5 to support five power channels 700C. For example, a first stator channel G1 provides a sinusoidal power output 740 with the first half of the sin wave 742 corresponding to the five rotor segments in group G11 and the second half of the sin wave 744 corresponding to the five rotor segments in the group G12.

In various embodiments, the operating frequency of these multipole machines is calculated based on rotor speed and the number of pole pairs. For example, a machine using the stator lattice of FIG. 7B has five pole pairs. If the rotor speed is 30,000 revolutions per minute (RPM), then the frequency equals the number of pole pairs (5) multiplied by the fundamental frequency (30,000 revolutions/60 seconds) or 2500 Hz.

Figure 7D:
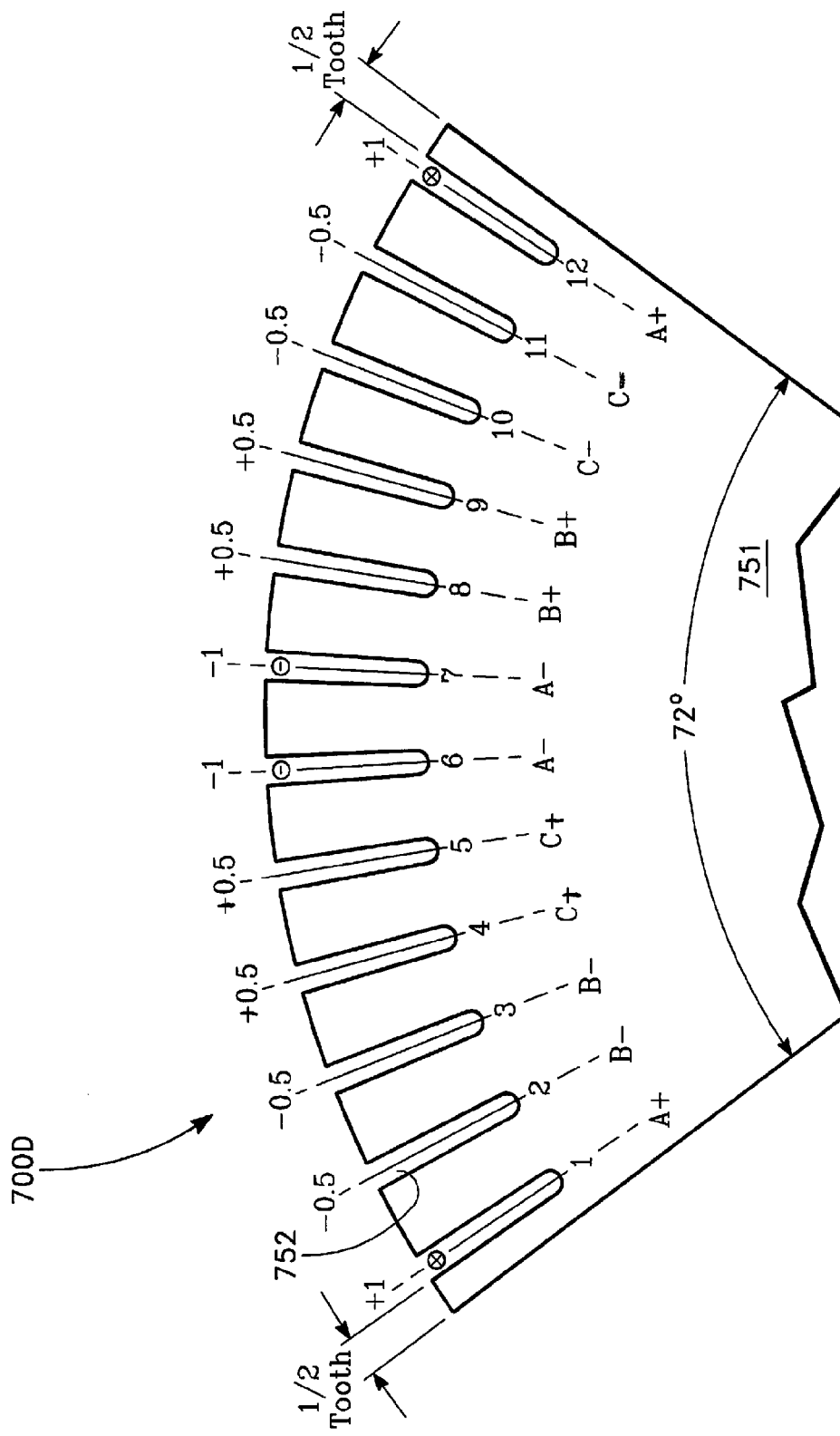
FIG. 7D shows a plan view of a portion of a slotted stator rim portion of FIG. 4A.

FIG. 7D shows a plan view of a portion of a slotted stator rim portion 700D. As shown, the slotted stator rim portion 751 sweeps through a 72° arc consistent with a stator of five stator channels for use in a five pole homopolar machine having five power channels. In the stator rim periphery are twelve stator slots 752 numbered 1-12. Each slot is for receiving a portion of an armature coil that is located between the armature coil's end turns. Notably, persons of ordinary skill in the art will recognize that the number of stator slots can be varied to accommodate differing armature coil designs and arrangements. In the embodiment shown, slots 1-12 receive respective windings for three phases A+(+1), B−(−0.5), B−(−0.5), C+(+0.5), C+(+0.5), A−(−1), A−(−1), B+(+0.5), B+(+0.5), C−(−0.5), C−(−0.5), A+(+1).

Figure 7E:
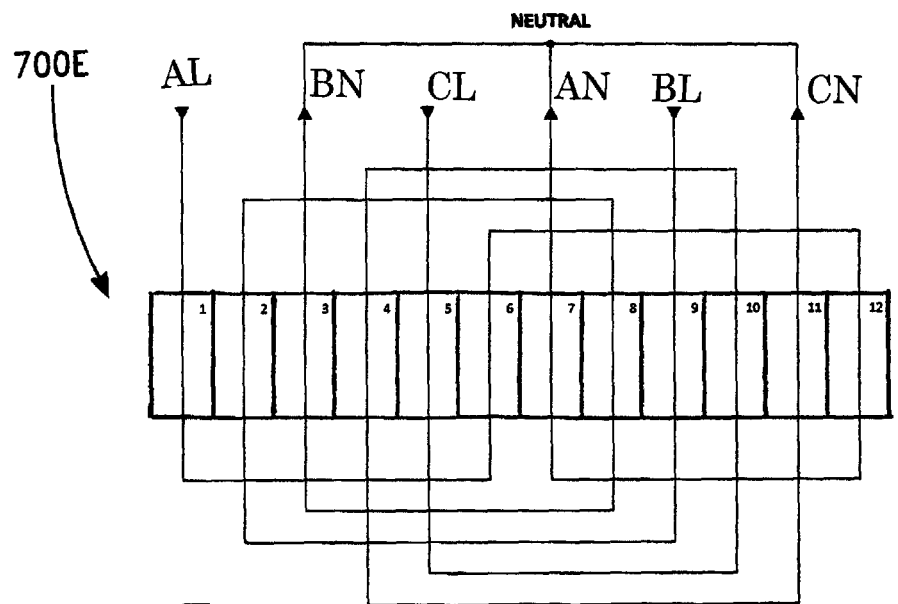
FIG. 7E illustrates how the armature coils for a single stator channel are positioned on a stator rim of FIG. 4A.

FIG. 7E illustrates how the armature coils for the single stator channel are positioned on a stator rim 700E. While the armature coils may be wound turn-by-turn on the stator, or fitted to the stator as completed coils, or interengaged with the stator by yet another means known to persons of ordinary skill in the art, or placed by some combination of these methods, we refer herein to armature coils and armature coil windings irrespective of the armature construction method used.

Figure 7F:
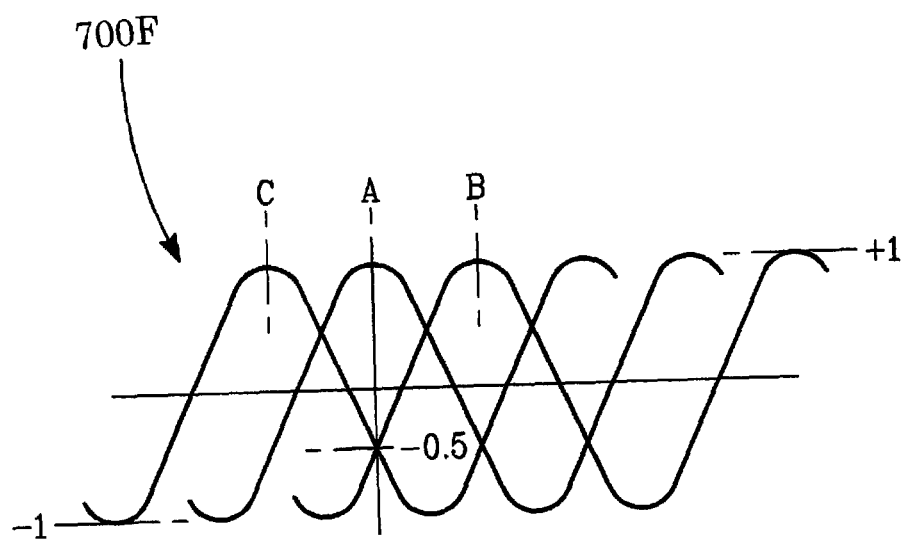
FIG. 7F illustrates the sinusoidal wave forms associated with armature coil phases of the armature coils of FIG. 7E.

As seen, three armature coil windings reflecting three electrical phases A, B, C are illustrated. A first armature coil winding AL/A+ engages slot 1, then slot 6 A−, then slot 12 A+, then slot 7 AN/A−. A second armature coil winding BL/B+ engages slot 9, then slot 2 B−, then slot 8 B+ then slot 3 BN/B−. A third armature coil winding CL/C+ engages slot 5, then slot 10 C−, then slot 4 C+, then slot 11 C−. In various embodiments, one end of each armature coil winding AL, BL, CL is for coupling to a power converter while the opposite ends of the armature coil windings AN, BN, CN are interconnected. FIG. 7F illustrates the sinusoidal waveforms associated with armature coil phases of FIG. 7E 700F.

Figure 7G:
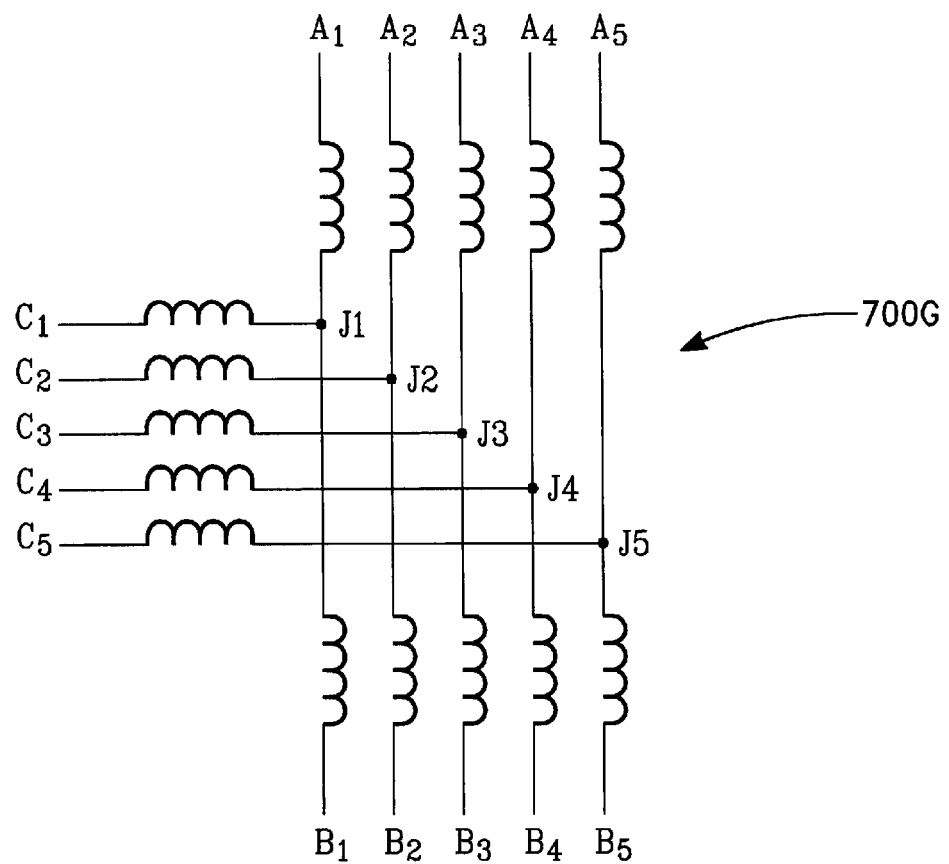
FIG. 7G schematically illustrates armature coils of a 3 phase, five channel homopolar motor generator stator.

FIG. 7G schematically illustrates the armature coils of a three phase five channel homopolar motor-generator stator 700G. At electrical junctions J1-J5, respective first ends of armature coils A1-A5, B1-B5, and C1-C5 are electrically interconnected. Opposing ends of these armature coils are grouped for interconnection with five power converters: A1, B1, C1; A2, B2, C2; A3, B3, C3; A4, B4, C4; and, A5, B5, C5.

Figure 7H:
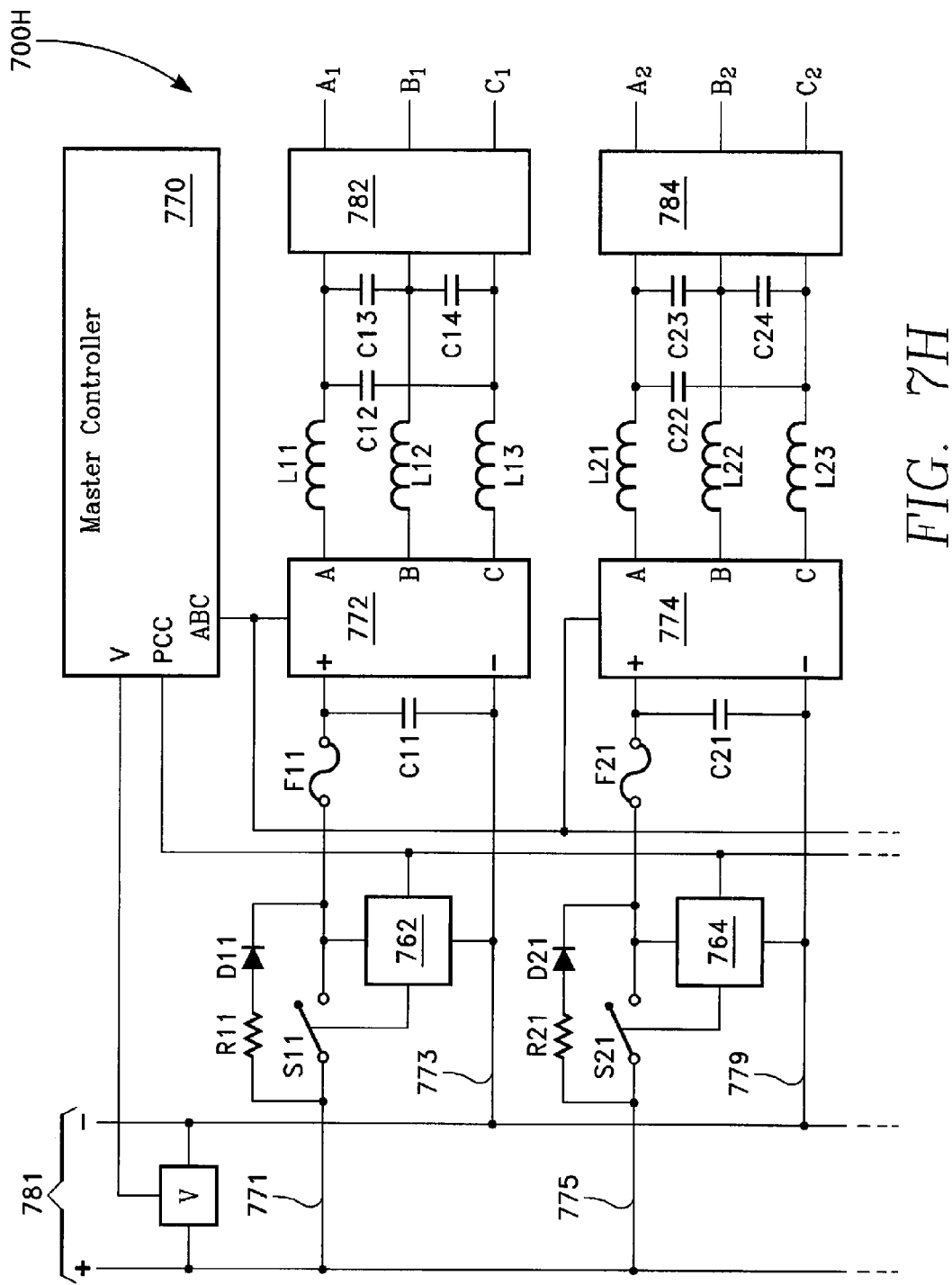
FIG. 7H schematically illustrates power electronics and controls for use with a homopolar motor-generator.

FIG. 7H schematically illustrates power electronics and controls 700H. This figure illustrates connections for two or more stator power channels. As shown, armature coil connections A1/B1/C1, A2/B2/C2 are made at power electronics junction blocks 782, 784 through which power is exchanged with converters 772 at respective phase connections A/B/C. Intermediate filtering comprises series inductor sets L11/L12/L13, L21/L22/L23 and across the phases capacitors C12/C13/C14, C22/C23/C24.

AC to DC converters 772 and 774 exchange electric power with a DC bus 781 via respective positive tie lines 771, 775 and negative tie lines 773, 779. Protection and controls interfacing the bus and the converters includes pre-charge circuitry and fusing. In an embodiment, these functions are realized with switches S11, S21 and related switch automation including a series connected resistor R11, R21 and diode D11, D21 across each switch and switch automation units 762, 764 for operating the switches in accordance with master controller commands and sensed converter DC voltage. The fusing function is provided by fuses F11, F21 in respective positive bus tie lines 771, 775. Capacitors C11 and C21 are across the converter DC terminals.

The master controller 770 is interconnected with each of the converters ABC and with each of the switch automation units PCC. Monitoring the bus voltage V, the master controller provides control signals to the switch automation units 762, 764 and the converters 772, 774 to, among other things, maintain a specified bus voltage.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

The invention claimed is:

1. A homopolar motor-generator comprising:
   a core assembly including a motor-generator stator;
   a plurality of stator rings arranged about a central axis;
   armature coils interengaging slots of the stator rings;
   one or more field coils, each coil encircling the central axis;
   a motor-generator rotor encircling the stator;
   the motor-generator rotor including a plurality of rotor segments; each rotor segment separated from the other rotor segments by non-magnetic material and,
   rotor segment lamellae that are stacked to form the rotor segments wherein each rotor segment lamella includes a curved central portion between uncurved projections, the curved central portion for following a contour of the motor-generator rotor.

2. A homopolar motor-generator comprising:
   a cylindrical rotor that encircles a motor-generator stator;
   the stator including field coils and armature coils;
   the rotor including a plurality of rotor segments;
   each rotor segment having a side iron interconnecting a magnetic one-half North pole and a magnetic one-half South pole;
   the rotor segment one-half poles extend from opposite sides of the side iron; and, rotor segment lamellae that are stacked to form the rotor segment;
wherein each rotor segment lamella includes a curved central portion between uncurved projections, the curved central portion for following a contour of the motor-generator rotor.

3. The homopolar motor of claim 2 wherein the rotor segment lamella are cut from sheet stock and the uncurved projections are bent in opposite directions to form a lamella.

4. A homopolar motor-generator comprising:
a cylindrical multipart rotor including rotor setments, the rotor encircling an "n" pole stator;
the stator having a central axis and stator field windings encircling the central axis;
the n poles of the stator defining n stator channels;
a set of armature coils associated with each stator channel, each set of armature coils configured for bidirectionally exchanging electric power with a respective AC to DC power converter in an n-channel power supply; and,
the rotor including rotor segment lamellae that are stacked to form rotor segments wherein each rotor segment lamella includes a curved central portion between uncurved projections, the curved central portion for following a contour of the motor-generator rotor.

5. A homopolar motor-generator machine comprising:
a core assembly arranged about a central axis;
the core assembly including a motor-generator stator;
stator rims axially spaced along the central axis and lying in planes perpendicular to the central axis;
one or more stator field coils, each coil encircling the central axis;
plural armature coil ways;
each way extending from rim to rim via stator rim slots;
a motor-generator rotor encircling the stator;
the motor-generator rotor including a plurality of rotor segments;
each rotor segment for completing a magnetic circuit between different stator rims: and,
rotor segment lamellae that are stacked to form the rotor segments wherein each rotor segment lamella includes a curved central portion between uncurved projections, the curved central portion for following a contour of the motor-generator rotor.

6. The machine of claim 5 further comprising:
rotor segment one-half poles and wherein the magnetic circuits do not include a permanent magnet.

7. The machine of claim 5 wherein the rotor is a backiron free rotor.

8. A homopolar motor-generator machine comprising:
a cylindrical rotor that defines an axis of revolution;
a motor-generator stator encircled by the rotor;
the stator including field coils arranged perpendicular to the axis of revolution;
the stator including armature coils arranged parallel to the axis of revolution;
the rotor including a plurality of rotor segments;
each rotor segment having a side iron interconnecting a magnetic one-half North pole and a magnetic one-half South pole; and,
rotor segment lamellae that are stacked to form the rotor segment wherein each rotor segment lamella includes a curved central portion between uncurved projections, the curved central portion for following a contour of the motor-generator rotor.

9. The machine of claim 8 further comprising:
within the rotor, rotor segment magnetic isolation material separating rotor segments.

10. The machine of claim 8 wherein the rotor is a backiron free rotor.

11. The machine of claim 8 further comprising:
one or more of the rotor segments shaped to complete respective magnetic circuits between stator rims spaced along the axis of revolution; and,
the magnetic circuits excluding permanent magnets.

12. A homopolar motor-generator machine comprising:
a cylindrical multipart rotor including rotor segments, the rotor encircling an "n" pole stator;
the stator having a central axis and one or more stator field windings;
each stator field winding encircling a field region of the central axis;
the n poles of the stator defining n stator channels;
sets of armature coils associated with each stator channel;
each armature coil extending over a central axis field region and each set of armature coils configured for bidirectionally exchanging electric power with a respective AC to DC power converter in an n-channel power supply; and,
rotor segment lamellae that are stacked to form the rotor segments wherein each rotor segment lamella includes a curved central portion between uncurved projections, the curved central portion for following a contour of the motor-generator rotor.

13. The machine of claim 12 further comprising:
within the rotor, rotor segment magnetic isolation material separating rotor segments.

14. The machine of claim 12 wherein the rotor is a backiron free rotor.

15. The machine of claim 12 further comprising:
respective rotor segment magnetic circuits including adjacent stator rims wherein the magnetic circuits exclude permanent magnets.

* * * * *